(Model.)
P. W. DOHERTY.
Stench Trap.
No. 239,741. Patented April 5, 1881.
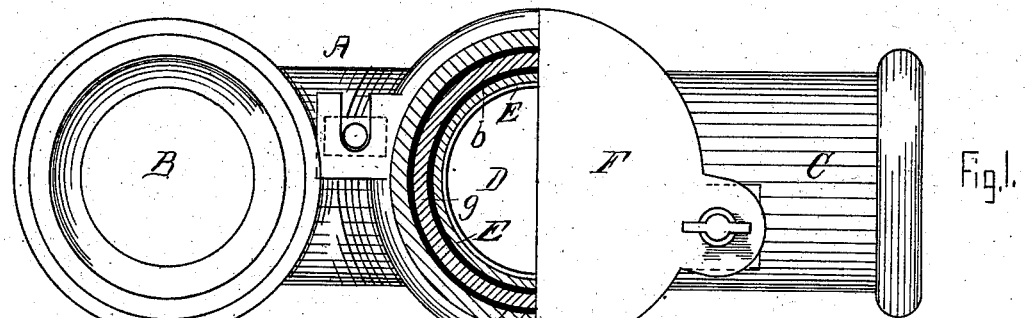
Fig. 1.
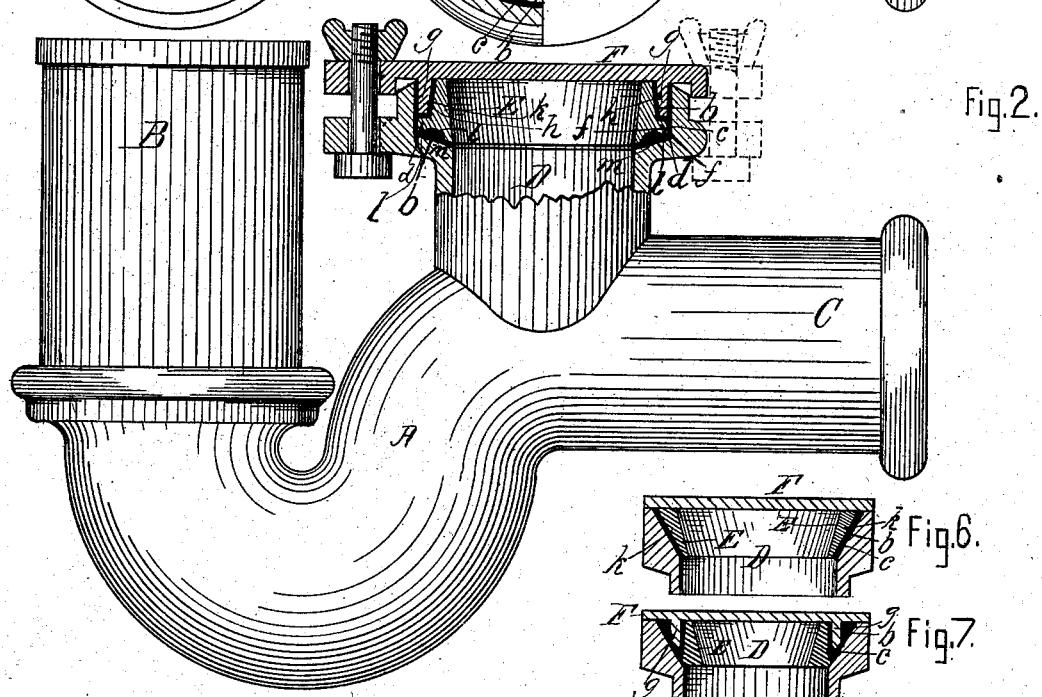
Fig. 2.
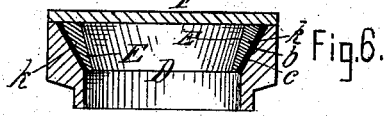
Fig. 6.
Fig. 7.
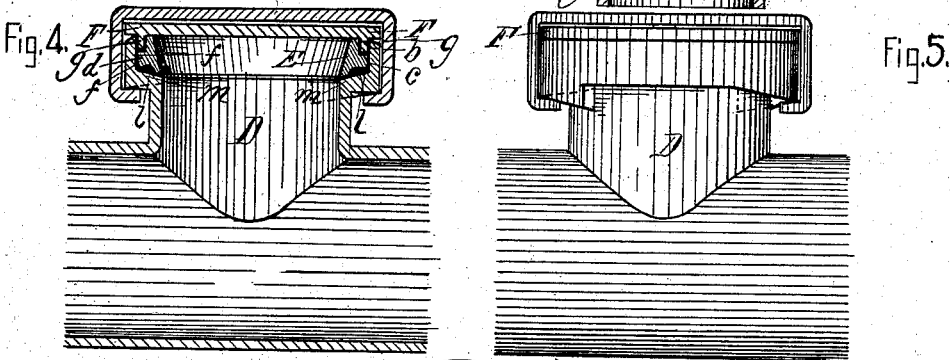
Fig. 4. Fig. 5.
Fig. 3.
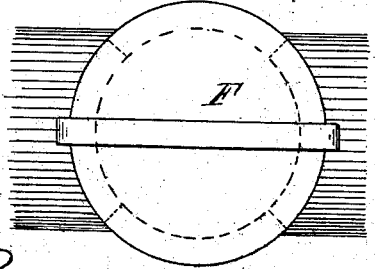
Witnesses.
Wm. S. Bellows.
L. S. Fairbanks.
P. W. Doherty,
Inventor.
Per Brown Bros,
Attys.

UNITED STATES PATENT OFFICE.

PATRICK W. DOHERTY, OF BOSTON, MASSACHUSETTS.

STENCH-TRAP.

SPECIFICATION forming part of Letters Patent No. 239,741, dated April 5, 1881.

Application filed January 20, 1881. (Model.)

*To all whom it may concern:*

Be it known that I, PATRICK W. DOHERTY, of Boston, in the county of Suffolk and State of Massachusetts, have invented certain new and useful Improvements in Stench-Traps, &c., of which the following is a full, clear, and exact description.

In the water and drainage systems for dwelling-houses and other buildings, as well-known, various contrivances—such as stench-straps, soil, and other pipes or conductors—are employed for carrying off and conducting the waste-water and other refuse or waste matter or matters to a sewer, cess-pool, or other suitable receptacle or locality, and as a general thing these contrivances have an opening or openings leading into them, by and through which to clear them of obstructions, should any occur, or otherwise to clean them, and these openings are closed by covers or lids which are packed with a view to prevent the escape of obnoxious gases or vapors, or of water or other liquids, or other matter or matters at such openings when so closed.

This invention pertains to the closing and packing of such openings to stench-traps, soil-pipes, &c.; and to that end it consists, in substance, first, of an opening into a stench-trap, &c., which is interiorly shouldered near its mouth, or otherwise, at such place inwardly contracted, in any suitable manner—as, for instance, by being made inwardly tapering—in combination with an independent and separate wall in the form of a ring or other suitable form, and constructed and adapted to surround the interior of said opening in its said shouldered or contracted part, and to leave a space between it and the sides of the so contracted opening for the reception of a packing capable of compression, such as hemp, putty, cement, &c., and when the cover or lid is applied to close the said opening to be capable of a movement under such application of the cover in a direction to secure a close and compact set and hold of the said packing material between it and the inside of the said opening; second, in stench-traps, &c., the combination, with an opening into the same interiorly constructed and provided with an inner separate and distinct wall, all substantially as above described, of a cover or lid for closing such opening, and for operating upon its said separate and distinct wall, which cover is constructed with a flange so arranged that when the cover is applied to close the said opening it will enter into the space between said opening and its inner separate wall and secure, in addition to the set and hold of the packing, as aforesaid, by the said inner separating-wall, a disposition and set and hold of the packing within said opening around and about the said flange; third, in stench-traps, &c., an opening into the same interiorly constructed and provided with an inner separate and distinct wall, all substantially as above described, in combination with a rib or flange or flanges upon said inner separate wall, constructed and arranged to project into the space between the said opening and said inner separate wall and otherwise adapted for the packing to surround the same, as such packing is set and held under the action of the cover or lid to the opening, and whether such cover has or has not an entering flange, all substantially as has been before described.

In the accompanying plate of drawings my improvements in stench-traps, &c., are illustrated.

Figure 1 is a plan view of a half-S stench-trap with the cover partially broken out; Fig. 2, a side view of same, but in part section; Fig. 3, a plan view of a soil or waste pipe; Fig. 4, a longitudinal vertical section, and Fig. 5 a side view, of same; Figs. 6 and 7 sectional views, as will hereinafter appear.

In the drawings, A represents a half-S stench-trap, having an inlet, B, and outlet C.

D is an opening into the outlet-branch C of the trap. This opening D is inwardly contracted, and in all the figures except Figs. 6 and 7 it is shown as made by the formation of a shoulder, *m*, at its inner end, and in Figs. 6 7 as inwardly tapering.

E is a ring within the opening D, and which makes the inner separate and distinct wall of this invention. The external diameter of this ring is such as to leave a space or chamber, *b*, between its exterior periphery and the side or wall *c* of the inwardly-contracted opening D, and its width is such that when the cover or lid F is placed over the opening D, and there rigidly and tightly secured in any suitable manner and in any of the ordinary modes of attaching such covers, the ring will be forced thereby toward the inner and small end or shoulder of the inwardly-contracted opening. This ring E has an external rib or flange, $d$, arranged to project into the space $b$, between the external periphery of the ring and the inner wall or side of the opening D, and this rib is of a diameter to leave a space between its outer edge, $f$, and the sides of the said opening.

The cover F has a flange, $g$, which enters into the space $b$, between the inner separate wall or ring, E, and the opening D, and otherwise the cover is constructed and adapted in any of the ordinary ways for placing it upon and fastening it in position over and upon the opening D to close the same, and in the drawings two forms of such fastening are shown; but it is not considered necessary to herein particularly describe either of them.

In the use of the cover having the flange $g$ and the ring E of the construction described with an inwardly-contracted opening, D, the several parts within the opening are to be packed with any suitable packing capable of compression, such as hemp, tow, putty, &c., which packing is placed therein and under the action of the ring E, and fastening of the cover F, as has been herein described, made to set and fix itself around and about the inwardly-contracted opening D, the flange $g$ of the cover F, and the ring E, all as shown by the heavy black line in the drawings.

Either the flange $g$ of the cover F or the rib $d$ of the ring E, or both, may be dispensed with; but it is preferable to use or combine them, as aforesaid, for obvious reasons.

Again, it is preferable to make the flange $g$ either upon one or both its sides tapering or inclining, as at $h$, and to similarly incline or taper the side of the ring which is against the packing, as shown at $k$, and to furthermore have a depression, as at $l$, in the face of the ring toward the inner end or shoulder $m$ of the opening, and, if desired, also a similar depression in the shoulder $m$, all for reasons too obvious to require particular mention herein.

Although this invention has been in detail described in connection with a stench-trap, it is obviously as applicable to waste, drain, soil, and other pipes or conductors.

The ring which makes the inside separate and distinct wall may be of various shapes other than that particularly described, and also may be made solid or otherwise formed.

Fig. 6 illustrates an inward tapering opening with the inward-projecting flange of the cover and the flange to the ring dispensed with. Fig. 7 illustrates the opening as inwardly tapering with an inward flange to the cover, all in accordance with this invention.

Having thus described my invention, what I claim, and desire to secure by Letters Patent, is—

1. In a stench-trap, &c., an opening inwardly contracted, in combination with an inside separate and distinct wall and cover, each and all relatively constructed and arranged together to act upon any suitable compressible packing within said opening, substantially as and for the purpose described.

2. In a stench-trap, &c., an opening inwardly contracted, in combination with an inside and separate and distinct wall and a cover having an inside flange, each and all relatively constructed and arranged together to act upon any suitable compressible packing within said opening, substantially as and for the purpose described.

3. In a stench-trap, &c., an opening inwardly contracted, in combination with an inside separate and distinct wall having a rib or flange and a cover, each and all relatively constructed and arranged together to act upon any suitable compressible packing within said opening, substantially as and for the purpose described.

In testimony whereof I have hereunto set my hand in the presence of two subscribing witnesses.

PATRICK W. DOHERTY.

Witnesses:
WM. S. BELLOWS,
EDWIN W. BROWN.